(12) United States Patent
Nakamura et al.

(10) Patent No.: US 7,967,712 B2
(45) Date of Patent: Jun. 28, 2011

(54) LUBRICATION OF A PLANETARY GEARSET

(75) Inventors: Yoshikazu Nakamura, Toyota (JP); Yuichi Nishida, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 94 days.

(21) Appl. No.: 12/280,406

(22) PCT Filed: Dec. 12, 2007

(86) PCT No.: PCT/IB2007/003871
§ 371 (c)(1), (2), (4) Date: Aug. 22, 2008

(87) PCT Pub. No.: WO2008/084307
PCT Pub. Date: Jul. 17, 2008

(65) Prior Publication Data
US 2010/0144479 A1  Jun. 10, 2010

(30) Foreign Application Priority Data
Dec. 28, 2006  (JP) ................................. 2006-355620

(51) Int. Cl.
*F16H 57/04*  (2010.01)

(52) U.S. Cl. ............................. 475/159; 74/468; 384/473
(58) Field of Classification Search .................... 74/468; 184/612
See application file for complete search history.

(56) References Cited

U.S. PATENT DOCUMENTS

| 1,132,748 A * | 3/1915 | Sundh ........................... 184/109 |
| 3,821,908 A | 7/1974 | Marsch et al. |
| 6,770,007 B2 * | 8/2004 | Fox ................................ 475/348 |

FOREIGN PATENT DOCUMENTS

| JP | 61-006065 U | 1/1986 |
| JP | 2004-270736 A | 9/2004 |
| JP | 2004-108452 A | 4/2008 |

* cited by examiner

*Primary Examiner* — Justin Holmes
(74) *Attorney, Agent, or Firm* — Kenyon & Kenyon LLP

(57) ABSTRACT

In a planetary gearset and an automatic transmission according to the invention, a pinion shaft on which a pinion gear is rotatably supported includes a bearing portion on which a bearing is attached and a polygonal portion having a polygonal outer periphery. An axial oil passage and radial oil passages that communicate with the axial oil passage are formed in the polygonal portion, and the inlet of each radial oil passage formed in the pinion gear faces the polygonal portion.

5 Claims, 13 Drawing Sheets

FIG. 2

|     | C1 | C2 | C3 | B1  | B2  | B3 | B4 | F1  | F2 | F3 |
|-----|----|----|----|-----|-----|----|----|-----|----|----|
| P   |    |    |    |     |     |    |    |     |    |    |
| REV |    |    | O  | (O) |     | O  | O  | O   |    |    |
| N   |    |    |    |     |     |    |    |     |    |    |
| 1ST | O  |    |    |     |     |    | (O)|     |    | O  |
| 2ND | O  |    |    | (O) | O   |    |    | O   | O  |    |
| 3RD | O  |    | O  | (O) |     | O  |    | O   |    |    |
| 4TH | O  | O  | ●  |     |     | ●  |    |     |    |    |
| 5TH |    | O  | O  | O   |     | ●  |    |     |    |    |
| 6TH |    | O  | ●  |     | O   |    |    |     |    |    |

(O) : ENGAGED ONLY FOR ENGINE BRAKE
● : ENGAGED WITH NO TORQUE TRANSMISSION

*PRIOR ART*

LUBRICATION OF A PLANETARY GEARSET

This is a 371 national phase application of PCT/IB2007/003871 filed 12 Dec. 2007, claiming priority to Japanese Patent Application No. 2006-355620 filed 28 Dec. 2006, the contents of which are incorporated herein by reference.

BACKGROUND OF THE INVENTION

1. Field of the Invention

The invention relates to a planetary gearset and an automatic transmission, and particularly to a planetary gearset and an automatic transmission provided in a vehicle in which enable the periphery of each pinion gear of the planetary gearset to be appropriately lubricated when the carrier of the planetary gearset is not rotating.

2. Description of the Related Art

In general, an automatic transmission for a vehicle includes a planetary gearset having: pinion gears that are provided between and mesh with a sun gear that is rotatable about the rotational center shaft and a ring gear that is provided on the radially outer side of the sun gear; and a carrier that has pinion shafts on which the pinion gears are rotatably supported via corresponding bearings, respectively, and which is rotatable about the rotational center shaft.

Because, in such a planetary gearset, the mesh area between the respective gears need to be lubricated for smooth rotation of each gear while minimizing the reduction of the durability of each gear, various designs have been developed for appropriate lubrication.

FIG. 12A and FIG. 12B each show the lubrication structure of a conventional planetary gearset (For example, see JP-A-2004-270736). Referring to FIG. 12A, a carrier 2 is rotatable about a rotational center shaft 1 that is coupled with an engine, and the carrier 2 has a pair of annular sidewalls 2a, 2b that are perpendicular to the axial direction of the rotational center shaft 1. Pinion shafts 3 are provided between the sidewalls 2a, 2b such that each of the pinion shafts 3 extends in parallel to the axial direction of the rotational center shaft 1.

A pinion gear 5 is rotatably supported on each pinion shaft 3 via a needle bearing 4. The pinion gears 5 are arranged between a sun gear 6 attached on the outer periphery of the rotational center shaft 1 and a ring gear 7 provided on the radically outer side of the sun gear 6, such that the pinion gears 5 mesh with the outer periphery of the sun gear 6 and the inner periphery of the ring gear 7.

Within each pinion shaft 3 is formed an axial oil passage 8 that extends in the axial direction and communicates with the space between the outer periphery of the pinion shaft 3 and the inner periphery of the pinion gear 5 via a through hole 9 extending in the radial direction of the pinion shaft 3. The lubricant that is guided into the axial oil passage 8 is supplied via the through hole 9 to the needle bearing 4 and to where the pinion gear 5 meshes with the ring gear 7. A guide plate 10 is integrally provided at the sidewall 2a, which guides lubricant into the axial oil passage 8.

The guide plate 10 is annular and intimately attached to the sidewall 2a so as to be coaxial with the rotational center shaft 1. The guide plate 10 is grooved such that a guide passage 11 is formed between the guide plate 10 and the sidewall 2a. As shown in FIG. 12B, the guide passage 11 is formed like the letter "S" as a whole, having: an intermediate passage 12 that extends straight in an oblique direction between the inner peripheral side and the outer peripheral side of the guide plate 10 across the inlet of the axial oil passage 8; a first guide portion 14 that extends straight towards the inner peripheral side from a first curve 13 that is a sharp curve at the outer peripheral side end of the intermediate passage 12; and a second guide portion 16 that extends straight towards the outer peripheral side from a second curve 15 that is a sharp curve at the inner peripheral side end of the intermediate passage 12. Being thus formed, the opening of the first guide portion 14 is located at the inner peripheral side of the axial oil passage 8 and the opening of the second guide portion 16 is located at the outer peripheral side of the axial oil passage 8.

In the guide passage 11 formed as descried above, when the automatic transmission is at a speed at which the carrier 2 is driven to rotate, lubricant moves towards the outer peripheral side due to centrifugal force and enters the first guide portion 14. This lubricant is then received by the first curve 13, is guided into the axial oil passage 8 from the intermediate passage 12 and flows out from the through hole 9, thus lubricating the needle bearing 4 and the mesh area between the pinion gear 5 and the ring gear 7.

For example, lubricant is supplied from an oil pump into an axial oil passage formed in the rotational center shaft 1, and the lubricant then moves from the rotational center shaft 1 towards the outer peripheral side due to the centrifugal force generated by the rotation of the rotational center shaft 1 and the centrifugal force generated by the rotation of the carrier 2.

Meanwhile, when the automatic transmission is at a speed at which the carrier 2 does not rotate, the lubricant, due to its own weight, flows down into the first guide portion 14 or into the second guide portion 16 and then flows into the axial oil passage 8 through the intermediate passage 12. Then, the lubricant flows out from the through hole 9 and lubricates the needle bearing 4 and the mesh area between the pinion gear 5 and the ring gear 7.

That is, at the pinion gear 5 that is standing still above the rotational center shaft 1, the lubricant, due to its own weight, flows down into the opening of the second guide portion 16 that is facing upward at this time, and the lubricant is then received by the second curve 15. Thereafter, the lubricant flows through the intermediate passage 12 and enters the axial oil passage 8, so that the pinion gear 5 is lubricated. On the other hand, at the pinion gear 5 that is standing still below the rotational center shaft 1, the lubricant, due to its own weight, flows down into the opening of the first guide portion 14 that is facing upward at this time, and the lubricant is then received by the first curve 13. Thereafter, the lubricant flows through the intermediate passage 12 and enters the axial oil passage 8, so that the pinion gear 5 is lubricated.

However, in such a conventional lubrication structure for planetary gearsets in which, using the guide plate 10, the lubricant flowing down into the first guide portion 14 or into the second guide portion 16 due to its own weight is guided into the axial oil passage 8 via the intermediate oil passage 12 and then discharged from the through hole 9, it is difficult to supply a sufficient amount of lubricant from each pinion gear 5 to the mesh area between the pinion gear 5 and the ring gear 7.

That is, because the through hole 9 extends in the radial direction of the pinion shaft 3, even if the lubricant flowing down due to its own weight is utilized as descried above when the carrier 2 is not rotating, a sufficient amount of lubricant may not be supplied via the through hole 9 to the mesh area between each pinion gear 5 and the ring gear 7, which is located on the radially outer side of the pinion gears 5. Thus, there is still a room for improvement.

Meanwhile, it is considered that the mesh area between each pinion gear 5 and the sun gear 6 can be lubricated by, for example, supplying lubricant from the rotational center shaft 1 to the mesh areas via an oil passage that is formed so as to extend in the radial direction of the sun gear 6, by utilizing the centrifugal forces generated by the rotations of the rotational center shaft 1 and the sun gear 6.

However, when so many oil passages for guiding lubricant are formed in the planetary gearset, because of the need for supplying lubricant into the many oil passages, the pressure of lubricant supplied from the oil pump to each oil passage becomes relatively low. This makes it further difficult to supply a sufficient amount of lubricant to the mesh area between each pinion gear 5 and the ring gear 7, which is located on the radially outer side of the pinion gear 5, and this may accelerate wear of the pinion gears 5 and the sun gear 6.

SUMMARY OF THE INVENTION

The invention provides a planetary gearset and an automatic transmission that enable lubricant to be reliably guided from a rotational center shaft to the area where the pinion gear meshes with the sun gear and to the area where the pinion gear meshes with the ring gear when the carrier is not rotating while the pinion shaft is rotating. Thereby improving the lubrication performance and minimizing wear of the pinion gears, the sun gear, and the ring gear.

One aspect of the invention relates to a planetary gearset including a sun gear that rotates about a rotational center shaft, a ring gear that is provided on the radially outer side of the sun gear, a pinion gear that is provided between the sun gear and the ring gear and meshes with the sun gear and the ring gear, a pinion shaft which extends substantially in parallel with the rotational center shaft and on which the pinion gear is rotatably supported via a bearing, and a carrier that rotates about the rotational center shaft. The pinion shaft has a first guide passage, which extends in the axial direction of the pinion shaft and into which lubricant is guided from the rotational center shaft, and a second guide passage, which extends towards the radially outer side of the pinion shaft and through which the lubricant is guided from the first guide passage to between the outer periphery of the pinion shaft and the inner periphery of the pinion gear. The pinion gear has a third guide passage which extends in the radial direction of the pinion gear and through which the lubricant that is guided to between the outer periphery of the pinion shaft and the inner periphery of the pinion gear is supplied to an area where the pinion gear meshes with the sun gear and to an area where the pinion gear meshes with the ring gear. The pinion shaft has a bearing portion on the outer periphery of which the bearing is attached and a polygonal portion having a polygonal outer periphery, whereby multiple spaces are defined between the outer periphery of the polygonal portion and the inner periphery of the pinion gear in the circumferential direction of the pinion shaft. The second guide passage is formed in the polygonal portion, and the inlet of the third guide passage faces the polygonal portion.

According to this structure, when the automatic transmission is at the speed at which the carrier and the pinion gears rotate, that is, when the automatic transmission is at the speed at which the pinion gears revolve around the sun gear, the lubricant guided into the first guide passage from the rotational center shaft due to the centrifugal force generated by the rotation of the rotational center shaft is further guided via the second guide passage to between the pinion shaft and the pinion gear so that the bearing is lubricated.

Then, due to the centrifugal force generated by the carrier, the lubricant is further guided via the third guide passage to the area where the pinion gear meshes with the sun gear and to the area where the pinion gear meshes with the ring gear.

On the other hand, when the automatic transmission is at the speed at which the carrier does not rotate but the pinion gear rotate, that is, when the automatic transmission is at the speed at which the pinion gear rotates without revolving around the sun gear, the lubricant guided into the first guide passage from the rotational center shaft, due to the centrifugal force generated by the rotation of the rotational center shaft, is further guided via the second guide passage into the space between the pinion shaft and the pinion gear, so that the bearing is lubricated.

As the pinion gear rotates, the capacity of the space between the outer periphery of the polygonal portion and the inner periphery of the pinion gear changes with respect to the third guide passage, which provides a pumping effect. Because of the pumping effect, the lubricant that has been guided into the space between the pinion shaft and the pinion gear is supplied into the third guide passage. The lubricant is then supplied from the third guide passage to the area where the pinion gear meshes with the sun gear and to the area where the pinion gear meshes with the ring gear. In this way, the lubricant may be reliably guided from the rotational center shaft to the area where the pinion gear meshes with the sun gear and to the area where the pinion gear meshes with the ring gear, respectively.

Further, in the above-described structure, the lubricant is guided to the area where the pinion gear meshes with the sun gear and to the area where the pinion gear meshes with the ring gear, respectively, via the first guide passage, the second guide passage, and the third guide passage, which are provided in series after the rotational center shaft. Thus, the lubricant takes a single lubricant path when guided from the oil pump to the area where the pinion gear meshes with the sun gear and when guided from the oil pump to the area where the pinion gear meshes with the ring gear.

This prevents a decrease in the pressure of lubricant supplied from the oil pump to each respective guide passage and thus enhances the pumping effect. As a result, the lubrication performance is improved and wear of the pinion gears, the sun gear, and the ring gear is minimized accordingly.

The planetary gearset described above may be such that the polygonal portion includes a polygonal member that is provided separately from the pinion shaft and has a polygonal outer periphery and is arranged to cover the pinion shaft and the second guide passage is formed in the pinion shaft and the polygonal member.

According to this structure, because the polygonal member is provided separately from the pinion shaft, the outer periphery of the pinion shaft does not need to be formed in a polygonal shape, and therefore a conventional pinion shaft may be used.

Also, the planetary gearset described above may be such that the inner periphery of the pinion gear that faces the polygonal portion is polygonal. In this case, the space between the outer periphery of the pinion shaft and the inner periphery of the pinion gear is partitioned into multiple spaces along the circumferential direction of the pinion shaft.

According to this structure, as the pinion gear rotates, the capacity of the space between the outer periphery of the pinion shaft and the inner periphery of the pinion gear changes more sharply with respect to the third guide passage. This further enhances the pumping effect for the lubricant that is guided via the second guide passage into the space between the pinion shaft and the pinion gear. As such, the lubricant is more reliably supplied via the third guide passage to the area where the pinion gear meshes with the sun gear and to the area where the pinion gear meshes with the ring gear, respectively.

Another aspect of the invention relates to an automatic transmission that includes a plurality of planetary gearsets configured as described above and changes, via the plurality of the planetary gearsets, the speed of rotation that is input to the rotational center shaft from an internal combustion engine and outputs the rotation. According to the automatic transmission thus configured, the lubrication performance improves, and therefore wear of the pinion gears, the sun gear, and the ring gear may be minimized.

Another aspect of the invention relates to a planetary gearset that includes a sun gear that rotates about a rotational center shaft; a ring gear that is provided on the radially outer side of the sun gear; a pinion gear that is provided between the sun gear and the ring gear and meshes with the sun gear and the ring gear; and a pinion shaft that extends substantially in parallel with the rotational center shaft and on which the pinion gear is rotatably supported via a bearing. The pinion shaft includes a bearing portion formed on the outer periphery of the pinion shaft and on which the bearing is attached; a non-uniform portion, located at a different position from the bearing portion in the axial direction of the pinion shaft, in which the distance between the axial center of the pinion shaft and the outer periphery of the non-uniform portion is non-uniform; a first guide passage that extends in the axial direction of the pinion shaft, and into which lubricant is guided from the rotational center shaft; and a second guide passage that is formed in the non-uniform portion and extends in the radial direction of the pinion shaft from the first guide passage, and through which the lubricant is guided from the first guide passage to between the outer periphery of the pinion shaft and the inter periphery of the pinion gear. A third guide passage is formed in the pinion gear, extending in the radial direction of the pinion gear, and the lubricant guided to between the outer periphery of the pinion shaft and the inner periphery of pinion gear is supplied through the third guide passage to an area where the pinion gear meshes with the sun gear and to an area where the pinion gear meshes with the ring gear. The inlet of the third guide passage faces the non-uniform portion.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 2 is an engagement chart indicating the engagement states for each speed established at the planetary gearset of the automatic transmission according to the first example embodiment of the invention;

DETAILED DESCRIPTION OF THE EXAMPLE EMBODIMENTS

Hereinafter, planetary gearsets and automatic transmissions according to example embodiments of the invention will be described with reference to the accompanying drawings.

FIG. 1 to FIG. 9 are views illustrating a planetary gearset and an automatic transmission according to the first example embodiment of the invention. The first example embodiment is an example in which a planetary gearset is incorporated in an automatic transmission.

Figure 1:
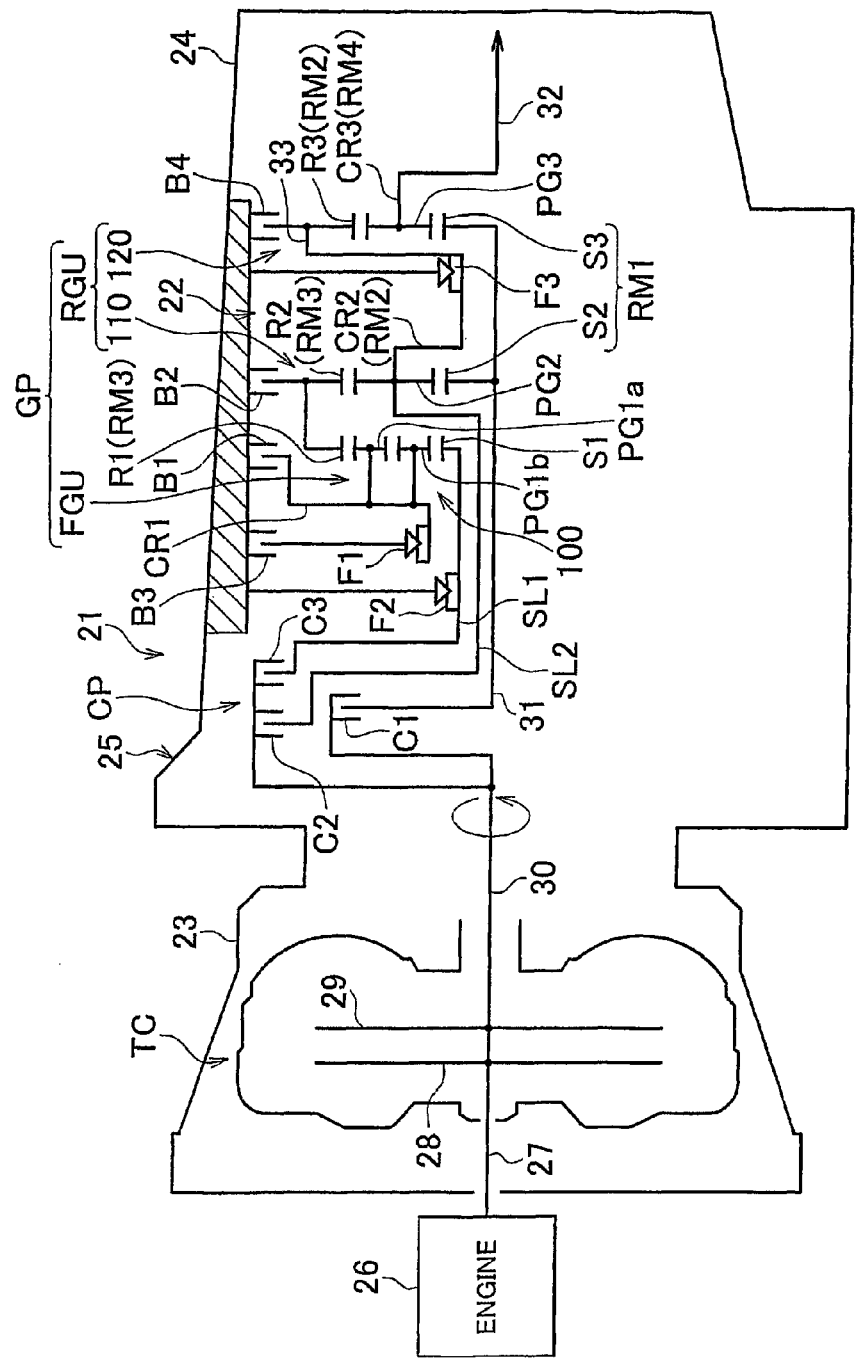
FIG. 1 is a view schematically showing the configuration of a planetary gearset provided in an automatic transmission according to the first example embodiment of the invention.

To begin with, the configuration of an automatic transmission 21 will be described. Referring to FIG. 1, the automatic transmission 21 includes a torque converter TC and a multi-speed shift mechanism 22 having a first planetary gearset 100, a second planetary gearset 110, and a third planetary gearset 120. The torque converter 22 and the multi-speed shift mechanism 22 are arranged in series on the same axis. The torque converter TC is disposed within an integral casing 25 that is constituted by a converter housing 23 and a transmission case 24.

The torque converter 22 includes an impeller 28 that is coupled to an output shaft of an engine 26 and a turbine 29 that is connected to the impeller 28 via fluid coupling. An input shaft 30 of the turbine 29 is connected to an intermediate shaft 31 that constitutes the rotational center shaft of the multi-speed shift mechanism 22.

The intermediate shaft 31 is connected to an output shaft 32. The output shaft 32 is connected via a differential unit to the right and left drive wheels. Note that the differential unit and the right and left drive wheels are not shown in the drawings. The intermediate shaft 31 is rotatably supported, at both sides thereof, on the transmission case 24 via the input shaft 30 and the output shaft 32, respectively.

The section of the multi-speed shift mechanism 22 on the torque converter TC side, which corresponds to the front side of the vehicle, is configured as a clutch section CP and the section on the output shaft 32 side, which corresponds to the rear side of the vehicle, is configured as a gear section GP. In the clutch section CP, three clutches, i.e., a first clutch C1, a second clutch C2, and a third clutch C3 are provided together with a hydraulic actuator, which is not shown in the drawings.

Among the three clutches, the second clutch C2 and the third clutch C3 are arranged in the outer peripheral side of the clutch section CP such that the second clutch C2 is located toward the front side of the vehicle and the third clutch C3 is located toward the rear side of the vehicle. That is, in the outer peripheral side of the clutch section CP, the second clutch C2 and the third clutch C3 are arranged substantially in line in the axial direction such that the rear side of the second clutch C2 and the front side of the third clutch C3 face each other. The first clutch C1 is arranged on the inner peripheral side of the second clutch C2 and the third clutch C3.

In the gear section GP, the first planetary gearset 100, the second planetary gearset 110, and the third planetary gearset 120 are arranged in this order from the front side of the vehicle. The first planetary gearset 100 includes a sun gear S1 that is formed on a sleeve shaft SL1. The second planetary gearset 110 includes a carrier CR2 that is coupled with a sleeve shaft SL2. The third planetary gearset 120 includes a sun gear S3 that is formed on the intermediate shaft 31.

A third brake B3, a first one-way clutch F1, and a second one-way clutch F2 are provided between the clutch section CP and the first planetary gearset 100 as viewed in the axial direction of the intermediate shaft 31. A third one-way clutch F3 is provided between the second planetary gearset 110 and the third planetary gearset 120.

The first brake B1 brakes a carrier CR1, on which pinion gears PG1a, PG1b are rotatably supported, with respect to the transmission case 24. The second brake B2 brakes a ring gear R1 of the first planetary gearset 100 and a ring gear R2 of the second planetary gearset 110.

The third brake B3, by cooperating with the first one-way clutch F1, allows the carrier CR1 of the first planetary gearset 100 to rotate only in the normal direction. The second one-way clutch F2 allows the sleeve shaft SL1 to rotate only in the normal direction, and the third one-way clutch F3 allows the sleeve shaft SL2 to rotate only in the normal direction.

The pinion gears PG1a, PG1b are rotatably supported on the carrier CR1 via corresponding pinion shafts, which will be described later. The carrier CR1 rotates about the sleeve shaft SL1. The pinion gears PG1a, PG1b are interposed between the sun gear S1 and the ring gear R1 and mesh with the sun gear S1 and the ring gear R1.

Pinion gears PG2 are rotatably supported on the carrier CR2 via corresponding pinion shafts, which will be described later. The carrier CR2 rotates about the intermediate shaft 31. The pinion gears PG2 are interposed between the sun gear S2 and the ring gear R2 and mesh with the sun gear S2 and the ring gear R2.

Likewise, pinion gears PG3 are rotatably supported on a carrier CR3 via corresponding pinion shafts, which will be described later. The carrier CR3 rotates about the intermediate shaft 31. The pinion gears PG3 are interposed between the sun gear S3 and the ring gear R3 and mesh with the sun gear S3 and the ring gear R3.

Next, the multi-speed shift operation of the multi-speed shift mechanism 22 will be described with reference to the engagement chart of FIG. 2 and the alignment chart of FIG. 3. The multi-speed shift mechanism 22 has, as different functional blocks, a front gear unit FGU that is comprised of the first planetary gearset 100 and a rear gear unit RGU that is comprised of the second planetary gearset 110 and the third planetary gearset 120.

The rear gear unit RGU has a total of four rotational elements: a first rotational element RM1 constituted by the sun gear S2 and the sun gear S3 which are coupled with each other via the intermediate shaft 31, a second rotational element RM2 constituted by the carrier CR2 and the ring gear R3 which are coupled with each other via a connecting member 33, a third rotational element RM3 constituted by the ring gear R1 and the ring gear R2 which are coupled with each other, and a fourth rotational element RM4 constituted by the carrier CR3 which is coupled with the output shaft 32. In this structure, the fourth rotational element RM4 serves as the rotational output element.

The first rotational element RM1 is connected to the first clutch C1 via the intermediate shaft 31. The second rotational element RM2 is connected to the second clutch C2 via the sleeve shaft SL2. The sun gear S1, which serves as the input member for the pinion gears PG1, is connected to the third clutch C3 via the sleeve shaft SL1.

Referring to FIG. 2, when establishing the first forward-drive speed (the first speed: 1ST), the first clutch C1 is engaged so that the input shaft 30 is connected to the sun gears S2, S3 (i.e., the first rotational element RM1). At this time, the third one-way clutch F3 blocks the reverse rotations of the carrier CR2 and the ring gear R3 (i.e., the second rotational element RM2). As such, the carrier CR2 is held stationary, whereby the rotation of the input shaft 30 is directly input to the sun gear S3 of the third planetary gearset 120 via the first clutch C1.

Figure 3:
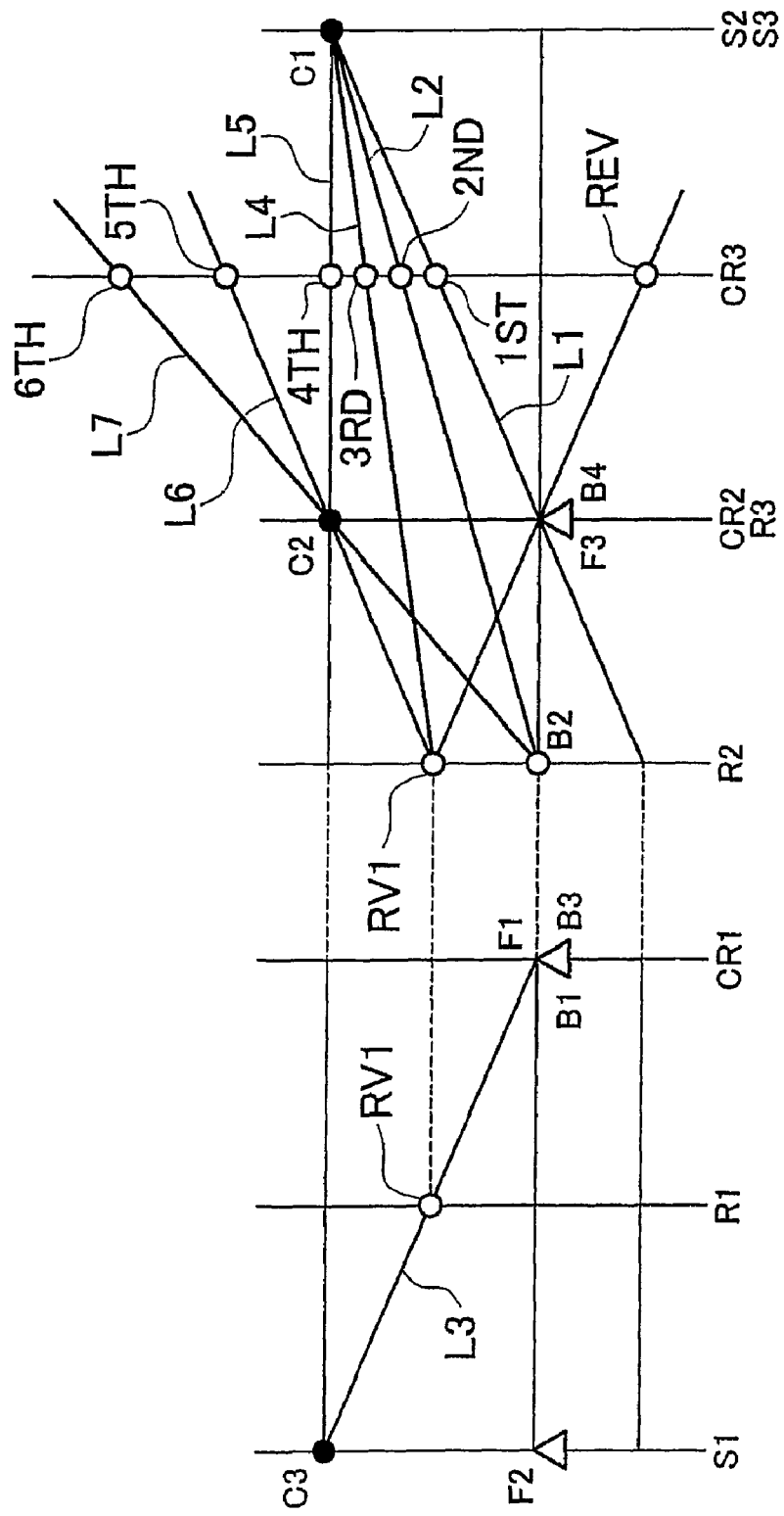
FIG. 3 is an alignment chart illustrating each speed established at the planetary gearset of the automatic transmission according to the first example embodiment of the invention.

As a result, with the ring gear R3 being locked by the third one-way clutch F3, the state indicated by the line L1 in the alignment chart of FIG. 3 is established where the first speed rotation in the normal rotational direction is obtained at the carrier CR3 that is coupled with the output shaft 32. Note that, at this time, the second planetary gearset 110 is idling with the sun gear S2 being rotated.

When engine brake is applied at the first speed, a fourth brake B4 is engaged so that the ring gear R3 and the carrier CR2 are more securely locked to enable the sun gear S2 to idle. That is, at the first speed, the carrier CR2 is locked and the pinion gears PG2 rotate without revolving around the sun gear S2.

When establishing the second forward-drive speed (the second speed: 2ND), as shown in FIG. 2, a brake B3 is also engaged as well as the clutch C1, which is engaged when establishing the first speed. In response to this, the third one-way clutch F3 is unlocked and the first one-way clutch F1 and the second one-way clutch F2 are locked.

At this time, because the carrier CR1 is held stationary by the locked first one-way clutch F1 and the sun gear S1 is held stationary by the second one-way clutch F2 locked by the engaged brake B3, the pinion gears PG1a, PG1b remain stationary. Thus, the ring gear R2 of the second planetary gearset 110, which is coupled with the ring gear R1, is also stationary.

In this state, the rotation of the input shaft 30 is input to the pinion gears PG2 via the first clutch C1 and the sun gear S2 and to the pinion gears PG3 via the first clutch C1 and the sun gear S3.

As such, in response to the rotation of the ring gear R2 of the second planetary gearset 110 being blocked as described above (speed=0), the state indicated by the line L2 in the alignment chart of FIG. 3 is established where the second speed rotation in the normal rotational direction is obtained at the carrier CR3 that is coupled with the output shaft 32.

When establishing the third forward-drive speed (the third speed: 3RD), as shown in FIG. 2, the third clutch C3 is also engaged as well as the first clutch C1, which is engaged also when establishing the first speed and the second speed, and the brake B3 is kept engaged. In response to this, the second one-way clutch F2 is unlocked while the first one-way clutch F1 remains locked.

In this state, the rotation of the input shaft 30 is additionally input to the sun gear S1 in the front gear unit FGU via the third clutch C3, as well as to the rear gear unit RGU via the first clutch C1, and the carrier CR1 is held stationary by the first one-way clutch F1.

Thus, due to the rotation of the input shaft 30 being input to the sun gear S1 of the first planetary gearset 100 and the carrier CR1 of the first planetary gearset 100 being held stationary, the state indicated by the line L3 in FIG. 3 is established where the normal direction rotation RV1 is output from the ring gear R1, which serves as the output member of the front gear unit FGU, to the ring gear R2 of the second planetary gearset 110, which serves as the input member of the rear gear unit RGU.

On the other hand, at this time, the rotation of the input shaft 30 is being input to the sun gears S2, S3 of the rear gear unit RGU, the rotation RV1 input to the ring gear R2 is integrated as indicated by the line IA in FIG. 3, so that the third speed rotation is obtained at the carrier CR3 coupled with the output shaft 32.

When establishing the fourth forward-drive speed (the fourth speed: 4TH), as shown in FIG. 2, the second clutch C2 is also engaged as well as the first clutch C1, which is engaged also when establishing the first speed, the second speed, and the third speed, and as well as the third clutch C3, which is engaged also when establishing the third speed. In response to this, the first one-way clutch F1 is unlocked.

In this state, the rotation of the input shaft 30 is input to the second carrier CR2 and the ring gear R3 via the second clutch C2, as well as to the sun gear S2 and the sun gear S3 of the rear gear unit RGU via the first clutch C1. Thus, the entire rear gear unit RGU, that is, the second planetary gearset 110 and the third planetary gearset 120 are directly connected and thus rotate together. As such, the state indicated by the line L5 in FIG. 3 is established where the fourth speed rotation is obtained at the carrier CR3 coupled with the output shaft 32.

At the second speed to the fourth speed described above, the carrier CR2 is not held stationary, and therefore the pinion gears PG2 revolve around the intermediate shaft 31.

When establishing the fifth forward-drive speed (the fifth speed: 5TH), as shown in FIG. 2, the first clutch C1 is released while the second clutch C2 and the third clutch C3 are kept engaged, and the first brake B1 is engaged.

In this state, the rotation of the input shaft 30 is input via the second clutch C2 to the carrier CR2 of the second planetary gearset 110 and the ring gear R3 of the third planetary gearset 120, which together form the rear gear unit RGU, and via the third clutch C3 to the sun gear S1 of the first planetary gearset 100, which forms the front gear unit FGU.

At this time, because the carrier CR1 is being held stationary by the first brake B1, the front gear unit FGU is placed in the state indicated by the line L3 in FIG. 3, where the slowed normal direction rotation RV1 is output from the ring gear R1 to the ring gear R2 of the rear gear unit RGU.

On the other hand, as described above, because the rotation of the input shaft 30 is input to the carrier CR2 and the ring gear R3 of the rear gear unit RGU, the state indicated by the line L6 in the alignment chart of FIG. 3 is established where the fifth speed rotation is obtained at the carrier CR3 and is transmitted therefrom to the output shaft 32.

When establishing the sixth forward-drive speed (the sixth speed: 6TH), as shown in FIG. 2, the second clutch C2 and the third clutch C3 are kept engaged and the second brake B2 is engaged while the first brake B1 and the third brake B3 are released.

In this state, the rotation of the input shaft 30 is input via the second clutch C2 to the carrier CR2 of the second planetary gearset 110 and the ring gear R3 of the third planetary gearset 120, which together form the rear gear unit RGU.

On the other hand, because the ring gear R2 is held stationary by the second brake B2, due to the above-described rotation of the carrier CR2, the sun gear S2 and the sun gear S3 rotate faster than they do at the fifth speed. Due to the rotation of the ring gear R3 and the high-speed rotation of the sun gear S3, the sixth speed rotation, which is faster than the fifth speed rotation, is obtained at the carrier CR3 and transmitted therefrom to the output shaft 32.

The sixth speed corresponds to the line L7 in the alignment chart of FIG. 3. In the state indicated by the line L7, the first brake B1 and the third brake B3 are released as shown in FIG. 2, the first brake B1 and the third brake B3 are not involved with the shifting of the automatic transmission 21. Also, although the third clutch C3 is kept engaged, because the second one-way clutch F2 is unlocked and the carrier CR1 of the first planetary gearset 100 is free, the third clutch C3 is not involved with the shifting of the automatic transmission 21. Note that descriptions on the parking position "P", the neutral position "N", and the reverse position "REV" are omitted. In FIG. 3, "REV" represents the reverse rotation speed.

Figure 4:
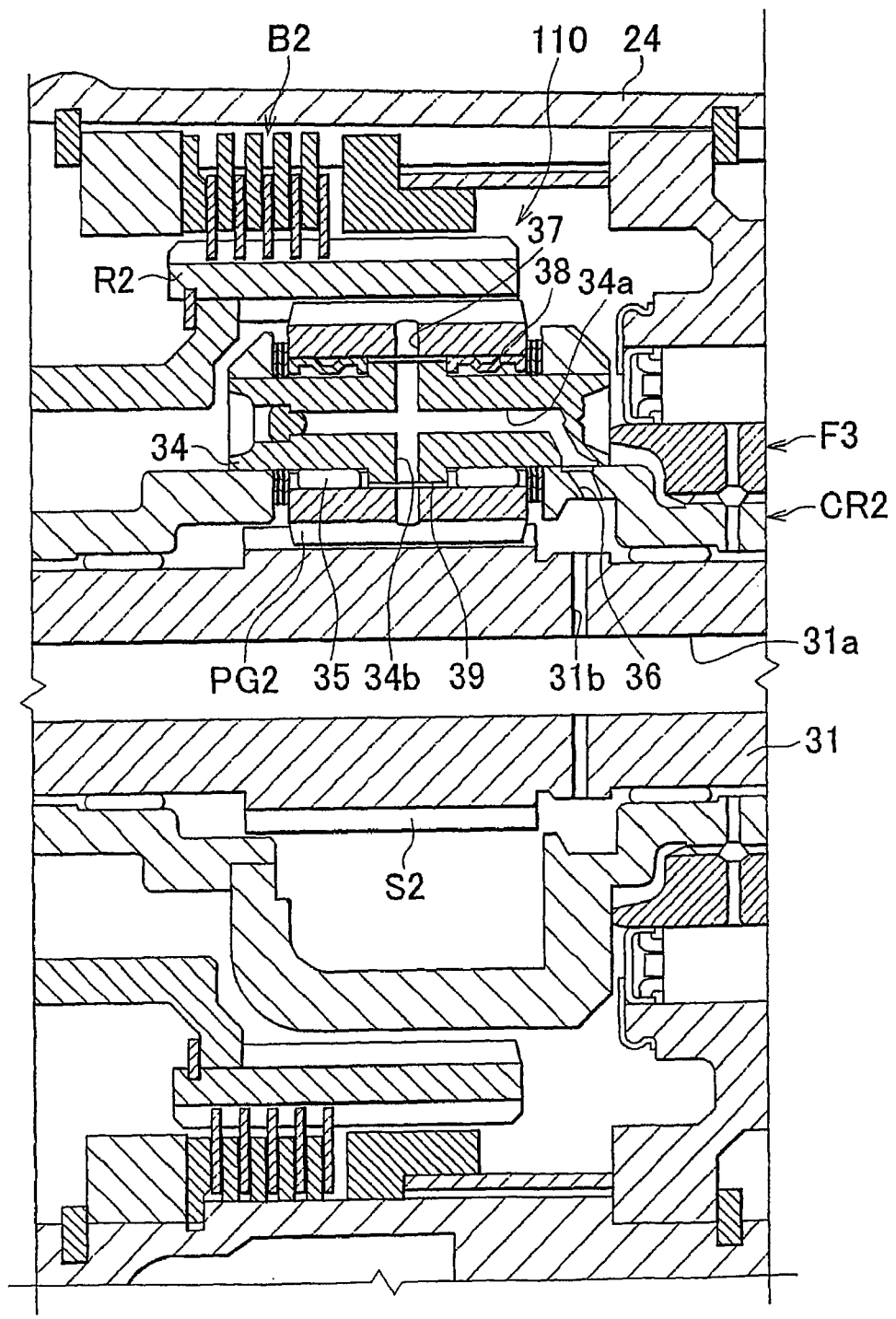
FIG. 4 is a cross-sectional view showing the second planetary gearset of the automatic transmission according to the first example embodiment of the invention.
Figure 5:
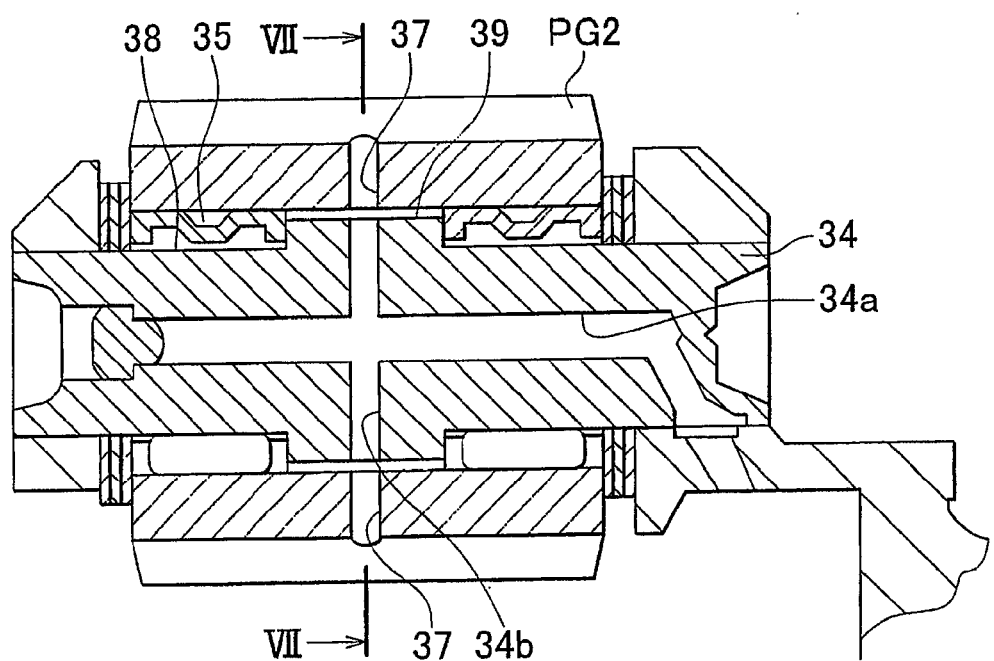
FIG. 5 is a cross-sectional view showing the pinion shaft and the pinion gear of the second planetary gearset of the automatic transmission according to the first example embodiment of the invention.

FIG. 4 and FIG. 5 are views for illustrating the lubrication structure around the pinion shaft 34 on which the pinion gear PG2 is supported. Referring to FIG. 4 and FIG. 5, the second planetary gearset 110 is a simple planetary gearset in which each pinion gear PG2 is rotatably supported via the needle bearing 35 on each pinion shaft 34 that is fixed at both ends on the carrier CR2. The front side of the carrier CR2 is coupled with the sleeve shaft SL2 and the rear side of the carrier CR2 is coupled with the ring gear R3 via the connecting member 33, and the ring gear R2, which meshes with the pinion gears PG2, is coupled with the ring gear R1.

As such, the multi-speed shift mechanism 22 of the example embodiment includes the second planetary gearset 110 having: the pinion gears PG2 which are arranged between the sun gear S2 and the ring gear R2 provided on the radially outer side of the sun gear S2 and which mesh with the sun gear S2 and the ring gear R2; and the carrier CR2 that is rotatable about the intermediate shaft 31 and has the pinion shafts 34 which extend substantially in parallel with the intermediate shaft 31 and on each of which each pinion gear PG2 is rotatably supported via the needle bearing 35.

Meanwhile, in the intermediate shaft 31, an axial oil passage 31a is formed so as to extend in the axial direction of the intermediate shaft 31, and lubricant is supplied into the axial oil passage 31a from an oil pump, which is not shown in the drawings. Further, in the intermediate shaft 31, radial oil passages 31b are formed so as to extend in the radial directions of the intermediate shaft 31. The radial oil passages 31b communicate with the axial oil passage 31a.

An oil passage 36 is formed in the carrier CR2, and the oil passage 36 communicates with the radial oil passages 31b. In each of the pinion shafts 34, an axial oil passage 34a is formed, as a first guide passage, that extends in the axial direction of the pinion shaft 34. The axial oil passage 34a communicates with the oil passage 36. Further, in each of the pinion shafts 34, radial oil passages 34b are also formed, as a second guide passage, that extend in the radial directions of the pinion shaft 34. The radial oil passages 34b communicate with the axial oil passage 34a.

Each radial oil passage 34b penetrates the pinion shaft 34 in the radial direction of the pinion shaft 34 such that the opening of the radial oil passage 34b faces the space between the outer periphery of the pinion shaft 34 and the pinion gear PG2.

In this example embodiment, lubricant is guided into the radial oil passages 34b due to centrifugal force generated by the rotation of the intermediate axis 31, via the axial oil passage 31a, the radial oil passages 31b, the oil passage 36, and the axial oil passage 34a. The lubricant is then guided into the space between the pinion shaft 34 and the pinion gear PG2 and lubricates the needle bearing 35.

In each of the pinion gears PG2, radial oil passages 37 are formed, as a third guide passage, that extend in the radial directions of the pinion gear PG2. Each of the radial oil passages 37 penetrates the pinion gear PG2 in the radial direction.

Each of the radial oil passages 37 communicates at one end with the space between the pinion shaft 34 and the pinion gear PG2 and at the other end with the area where the sun gear S2 meshes with the pinion gear PG2 and the area where the ring gear R2 meshes with the pinion gear PG2. Through the radial oil passages 37, lubricant is supplied from the space between the pinion shaft 34 and the pinion gear PG2 to the area where the sun gear S2 meshes with the pinion gear PG2 and to the area where the pinion gear PG2 meshes with the ring gear R2, respectively.

Figure 6:
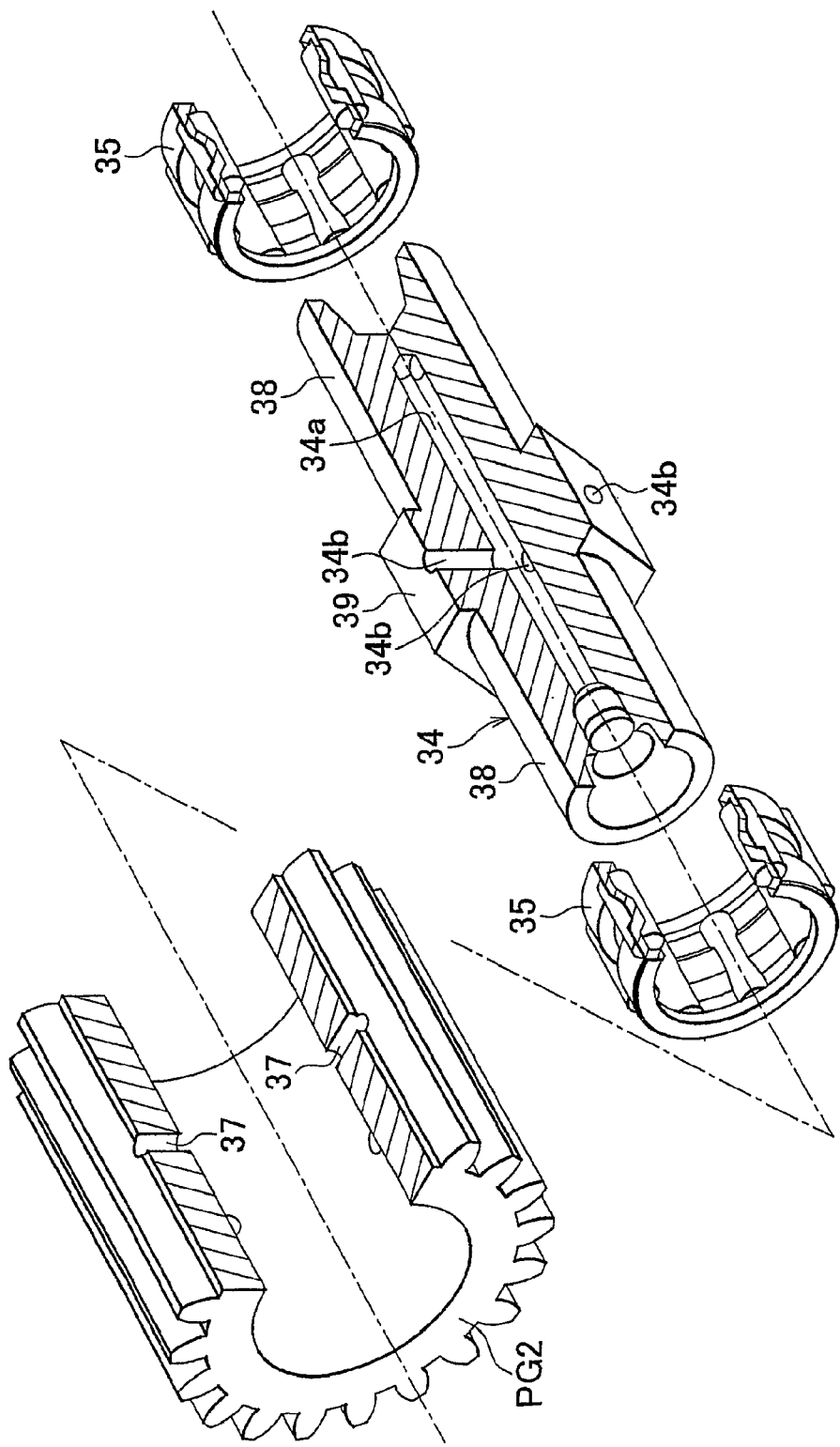
FIG. 6 is a perspective view showing the pinion shaft and the pinion gear of the second planetary gearset of the automatic transmission according to the first example embodiment of the invention.
Figure 7:
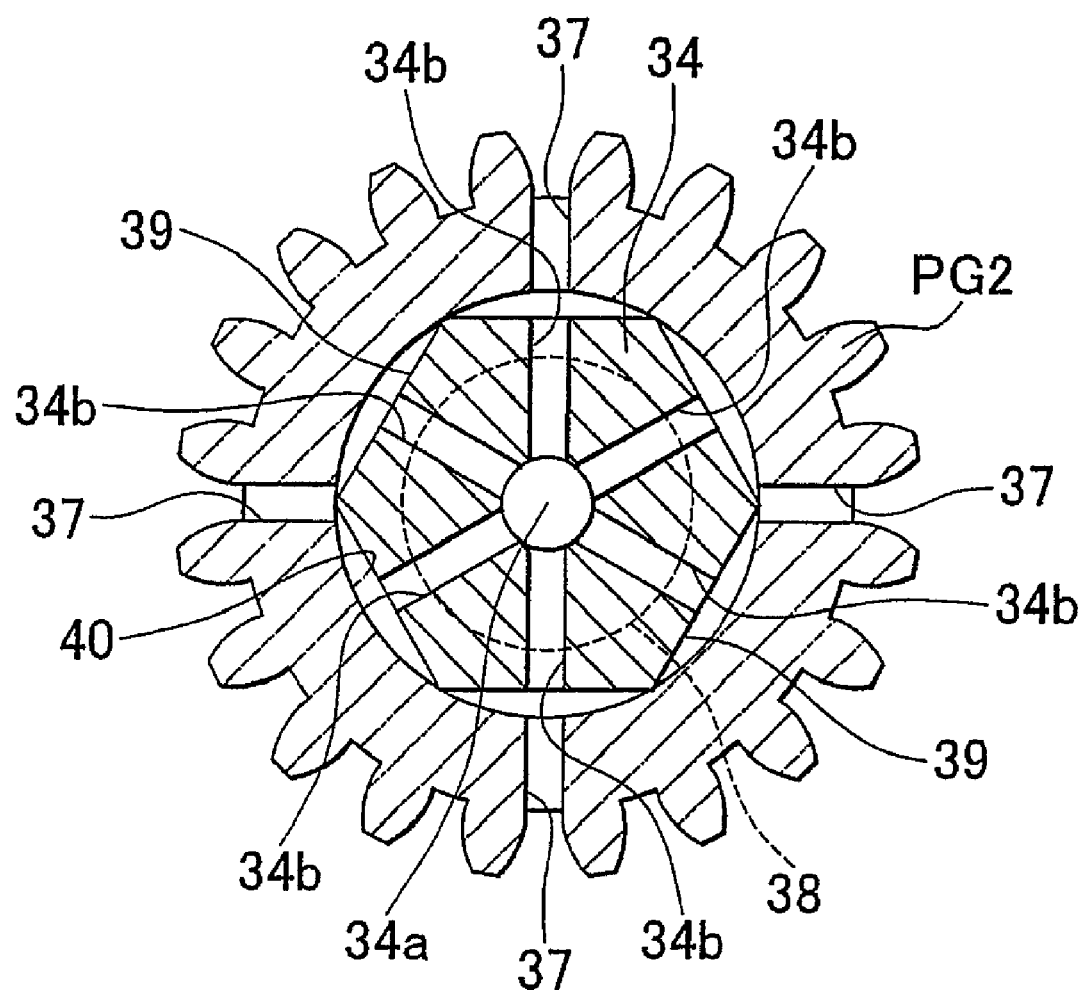
FIG. 7 is a cross-sectional view taken along the line VII-VII in FIG. 5.
Figure 8A:
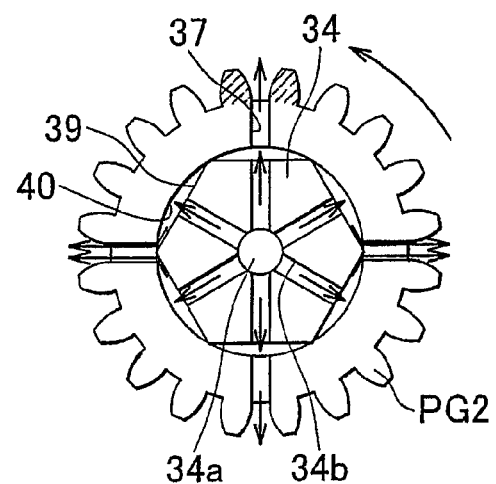
FIG. 8A to FIG. 8E are views each illustrating the pumping effect that is demonstrated when lubricant is guided into the space between the pinion shaft and the pinion gear in the planetary gearset of the automatic transmission according to the first example embodiment of the invention.
Figure 8B:
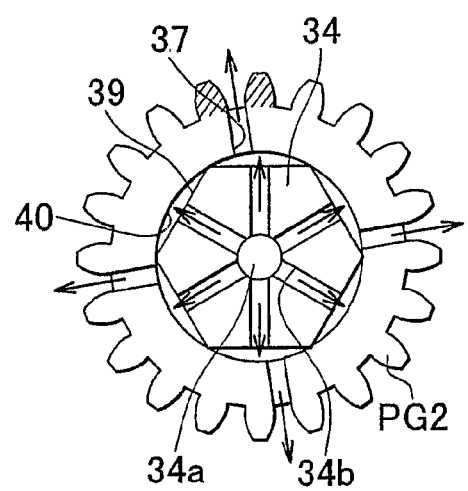
Figure 8C:
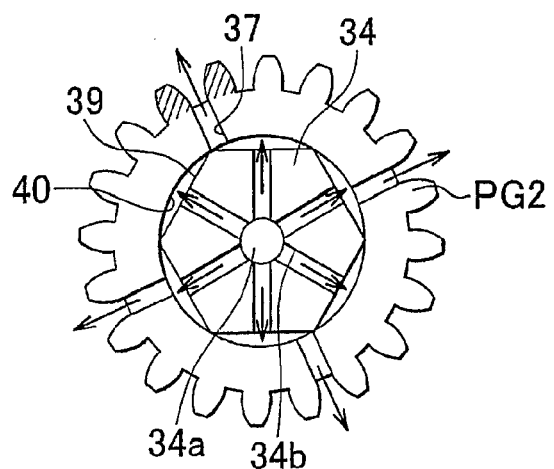
Figure 8D:
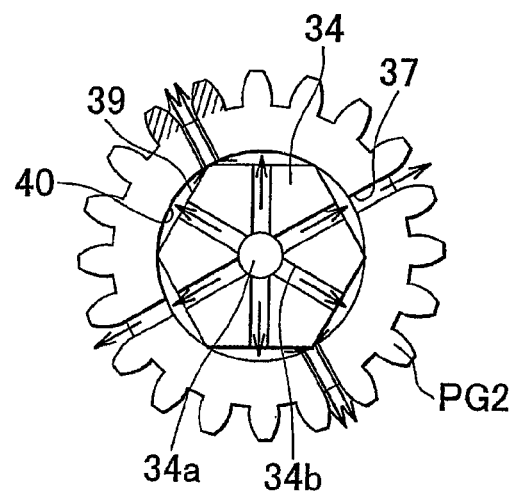
Figure 8E:
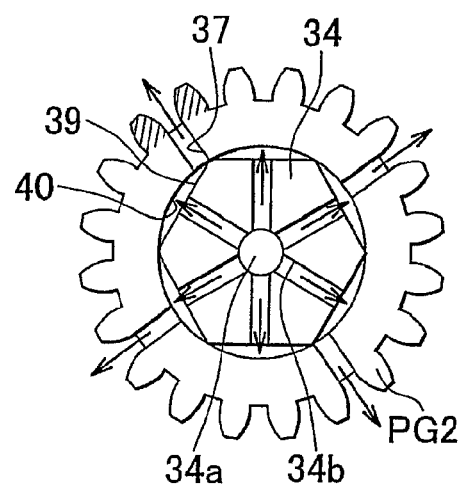

Meanwhile, referring to FIG. 6 and FIG. 7, each of the pinion shafts 34 has a circular bearing portion 38, on the outer periphery of which the needle bearing 35 is attached, and a polygonal portion 39 having a polygonal outer periphery. In this example embodiment, the polygonal portion 39 has a hexagonal outer periphery. The space defined between the outer periphery of the polygonal portion 39 and the inner periphery of the pinion gear PG2 is partitioned into six spaces 40 along the circumferential direction of the pinion shaft 34.

The radial oil passages 34b are formed in the polygonal portion 39 and the inlets of the radial oil passages 37 face the polygonal portion 39.

Next, the method for lubricating the automatic transmission 21 of the example embodiment will be described. In this example embodiment, when the automatic transmission 21 is at the speed at which the intermediate shaft 31 is connected to the input shaft 30 via the first clutch C1 and the carrier CR2 and the pinion gears PG2 rotate, that is, at which the pinion gears PG2 revolve, i.e., when the automatic transmission 21 is at the second speed, the third speed, or the fourth speed, lubricant is guided, due to the centrifugal force generated by the rotation of the intermediate shaft 31, to the space between the pinion shaft 34 and the pinion gear PG2 via the axial oil passage 31a in the intermediate shaft 31, the radial oil passages 31b, the oil passage 36, the axial oil passage 34a, and the radial oil passages 34b, so that the needle bearing 35 is lubricated.

Further, due to the centrifugal force generated by the rotation of the carrier CR2, the lubricant guided into the space between the pinion shaft 34 and the pinion gear PG2 is further guided to the area where the sun gear S2 meshes with the pinion gear PG2 and to the area where the pinion gear PG2 meshes with the ring gear R2, respectively, so that each mesh area is lubricated.

On the other hand, when the automatic transmission 21 is at the speed at which the intermediate shaft 31 is connected to the input shaft 30 via the first clutch C1 and the pinion gears PG2 rotate without revolving around the sun gear S2, that is, when the automatic transmission 21 is at the first speed, because the carrier CR2 does not rotate, no centrifugal force is generated by the carrier CR2.

In this example embodiment, the lubricant that is guided into the space between the pinion shaft 34 and the pinion gear PG2 due to the centrifugal force generated by the rotation of the intermediate shaft 31, from the axial oil passage 31a in the intermediate shaft 31 via the radial oil passages 31b, the oil passage 36, the axial oil passage 34a, and the radial oil passages 34b is further guided into the space between the polygonal portion 39 and the pinion gear PG2.

At this time, as the pinion gears PG2 rotate, the capacity of each of the spaces 40 between the outer periphery of the polygonal portion 39 and the inner periphery of the pinion gear PG2 changes with respect to the radial oil passage 37 as shown in FIG. 8A to FIG. 8E. Thus, due to the pumping effect provided by the pinion gear PG2 rotating on the polygonal portion 39, the lubricant guided into the spaces 40 between the polygonal portion 39 and the pinion gear PG2 is guided to the radial oil passage and is further supplied to the area where the pinion gear PG2 meshes with the sun gear S2 and to the area where the pinion gear PG2 meshes with the ring gear R2, respectively. Note that the arrows in FIG. 8A to FIG. 8E represent lubricant flows.

As such, even when the automatic transmission 21 is at the speed at which each pinion gear PG2 that is located on the outer periphery of the pinion shaft 34 rotates without revolving around the sun gear S2, lubricant may be reliably guided from the intermediate shaft 31 to the area where the pinion gear PG2 meshes with the sun gear S2 and to the area where the pinion gear PG2 meshes with the ring gear R2, respectively.

Also, in the example embodiment described above, lubricant is guided to the area where the pinion gear PG2 meshes with the sun gear S2 and to the area where the pinion gear PG2 meshes with the ring gear R2 via the radial oil passages 31b, the oil passage 36, the axial oil passage 34a, and the radial oil passages 34b, which are provided in series after the axial oil passage 31a in the intermediate shaft 31. Thus, the lubricant takes a single lubricant path when guided from the oil pump to the area where the pinion gear PG2 meshes with the sun gear S2 and when guided from the oil pump to the area where the pinion gear PG2 meshes with the ring gear R2, respectively, which enhances the pumping effect. As a result, the lubrication performance improves accordingly, minimizing wear of the pinion gears PG2, the sun gear S2, and the ring gear R2.

Meanwhile, regarding the lubrication structure for the third planetary gearset 120, it is not necessary to form a polygonal portion in each pinion shaft on which each pinion gear PG3 is rotatably supported, because the pinion gears PG3 rotate at any speed of the automatic transmission 21. However, a polygonal portion may be formed in each pinion shaft in the third planetary gearset 120, as in each pinion shaft in the second planetary gearset 110, in order to further improve the lubrication performance.

Also, with regard to the first planetary gearset 100, because the intermediate shaft 31 is not connected to the input shaft 30 via the first clutch C1 at the fifth speed and at the six speed as shown in FIG. 2, it is impossible to utilize the centrifugal force of the intermediate shaft 31 to guide lubricant to the pinion gears PG1.

In this example embodiment, although not shown in the drawings, an axial oil passage is formed in the sleeve shaft SL1, which serves as the rotational center shaft and on the outer periphery of which the sun gear S1 is integrally formed. The axial oil passage extends in the axial direction of the sleeve shaft SL1 and communicates with radial oil passages formed in the sleeve shaft SL1. The radial oil passages communicate with oil passages formed in each pinion gear PG1.

Hereinafter, the lubrication structure for the first planetary gearset 100 will be described with reference to FIG. 9. Note that, in the following, the structure of the pinion shafts in the first plenary gearset 100 will not be described in detail because they are structurally the same as the pinion shafts of the third planetary gearset 120.

Figure 9:
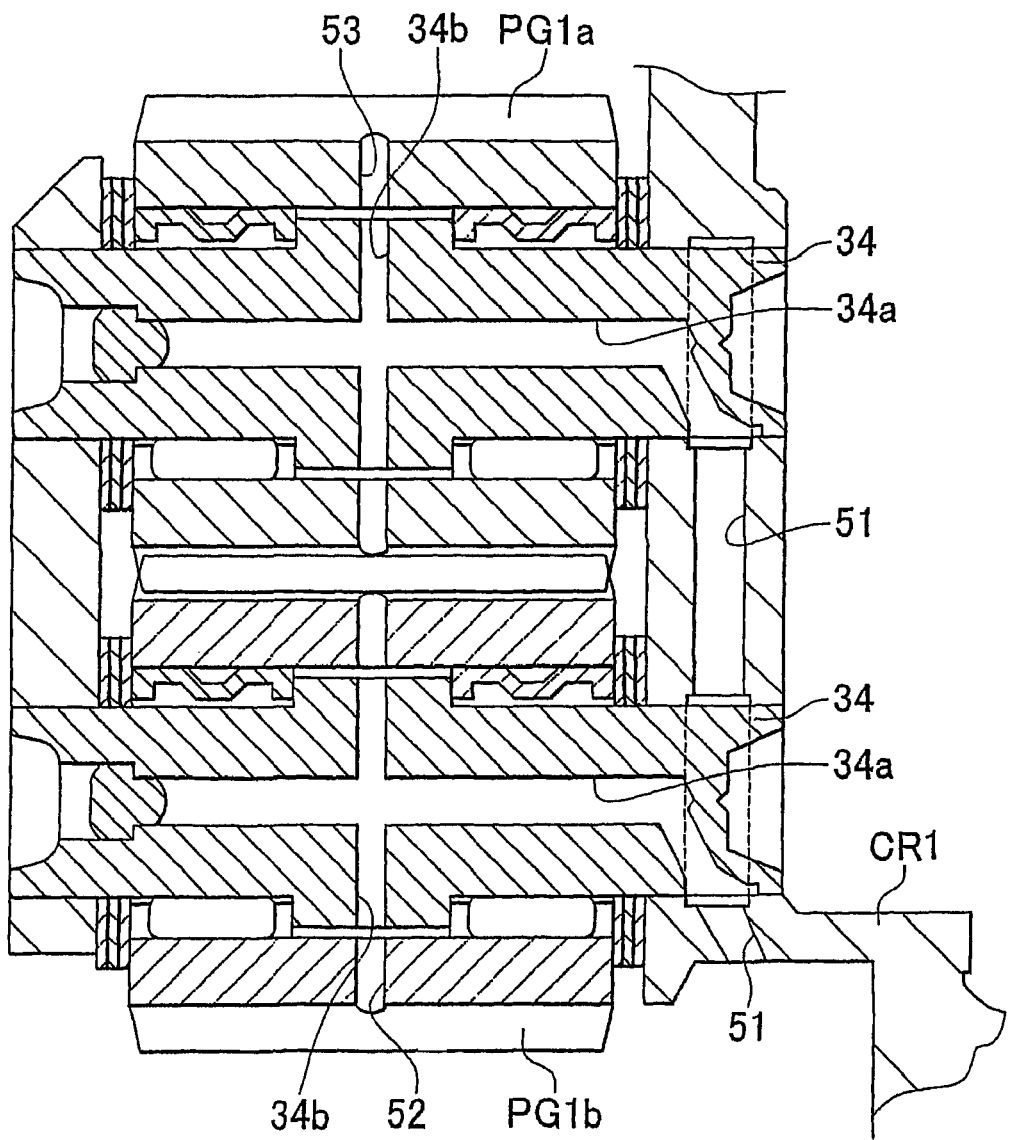
FIG. 9 is a view showing the lubrication structure for the first planetary gearset of the automatic transmission according to the first example embodiment of the invention.

Referring to FIG. 9, the first planetary gearset 100 has a double-pinion arrangement in which the carrier CR1 has pairs of pinion shafts on which the pinion gears PG1a, PG1b are rotatably supported via the needle bearings 34, respectively.

Specifically, the first planetary gearset 100 of the multi-speed shift mechanism 22 is constituted by pinion gears PG1a, PG1b and the carrier CR1 that rotates about the sleeve shaft SL1 and has pairs of pinion shafts each extending substantially in parallel with the sleeve shaft SL1. The pinion gears PG1a, PG1b are rotatably supported on each pair of the pinion shafts via the needle bearings 35. Thus, the pinion gears PG1a, PG1b are located between the sun gear S1 and the ring gear R1, which is located on the radially outer side of the sun gear S1, and mesh with the sun gear S1 and the ring gear R1, respectively.

An oil passage 51 is formed in the carrier CR1 of the first planetary gearset 100, which communicates with the radial oil passages in the sleeve shaft SL1. The oil passage 51 also communicates with the axial oil passage 34a that is formed as the first guide passage in each pinion shaft 34 so as to extend in the axial direction of the pinion shaft 34.

The axial oil passage 34a communicates with the radial oil passages 34b that are formed as the second guide passage in each pinion shaft 34 so as to extend in the radial directions. The radial oil passages 34b communicate with the space between the pinion shaft 34 and the pinion gear PG1a and with the space between the pinion shaft 34 and the pinion gear PG1b, respectively.

The radial oil passages 34b penetrate the pinion shaft 34 in the radial directions thereof, and the outlets of the respective radial oil passages 34b face the space between the polygonal portion 39 and the pinion gear PG1a and the space between the polygonal portion 39 and the pinion gear PG1b, respectively.

Radial oil passages 52, 53 are formed, as the third guide passage, in the pinion gears PG1a, PG1b so as to extend in the radial directions of the pinion gears PG1a, PG1b, respectively.

One of the radial oil passages 52 communicates at one end with the space between the pinion shaft 34 and the pinion gear PG1b and at other end with the area where the sun gear S1 meshes with the pinion gear PG1b, and the other of the radial oil passages 52 communicates at one end with the space between the pinion shaft 34 and the pinion gear PG1b and at the other end with the area where the pinion gear PG1a meshes with the pinion gear PG1b. Thus, through the radial oil passages 52, lubricant is guided from the space between the pinion shaft 34 and the pinion gear PG1b to the area where the sun gear S1 meshes with the pinion gear PG1b and to the area where the pinion gear PG1a meshes with the pinion gear PG1b, respectively.

On the other hand, one of the radial oil passages 53 communicates at one end with the space between the pinion shaft 34 and the pinion gear PG1a and at the other end with the area where the ring gear R1 meshes with the pinion gear PG1a, and the other of the radial oil passages 53 communicates at one end with the space between the pinion shaft 34 and the pinion gear PG1a and at the other end with the area where the pinion gear PG1a meshes with the pinion gear PG1b. Thus, through the radial oil passages 53, lubricant is guided from the space between the pinion shaft 34 and the pinion gear PG1a to the area where the ring gear R1 meshes with the pinion gear PG1a and where the pinion gear PG1a meshes with the pinion gear PG1b, respectively.

With regard to the pinion gears PG1a, PG1b, when the automatic transmission 21 is at the speed at which the sleeve shaft SL1 is connected to the input shaft 30 via the third clutch C3 and the pinion gears PG1a and the pinion gears PG1b rotate without revolving around the sun gear S1, that is, when the automatic transmission 21 is at the fifth speed, no centrifugal force is generated by the carrier CR1 because the carrier CR1 does not rotate, as indicated in FIG. 3.

According to the example embodiment, the lubricant guided, due to the centrifugal force generated by the rotation of the sleeve shaft SL1, into the space between the pinion shaft 34 and the pinion gear PG1a from the axial oil passage in the sleeve shaft SL1 via the radial oil passages in the sleeve shaft SL1, the oil passage 51, the axial oil passage 34a, and the radial oil passages 34b is then guided into the space between the polygonal portion 39 and the pinion gear PG1a. Likewise, the lubricant guided into the space between the pinion shaft 34 and the pinion gear PG1b, due to the centrifugal force generated by the rotation of the sleeve shaft SL1, from the axial oil passage in the sleeve shaft SL1 via the radial oil passages in the sleeve shaft SL1, the oil passage 51, the axial oil passage 34a, and the radial oil passages 34b is then guided into the space between the polygonal portion 39 and the pinion gears PG1b.

At this time, as the pinion gears PG1a, PG1b rotate, the capacity of each of the spaces between the outer periphery of the polygonal portion 39 and the inner periphery of the pinion gear PG1a and the spaces between the outer periphery of the polygonal portion 39 and the inner periphery of the pinion gear PG1b changes with respect to each radial oil passage 37 as in the case shown in FIG. 8. Thus, due to the pumping effects provided by the pinion gears PG1a, PG1b each rotating on the polygonal portion 39, the lubricant that is guided into the space between the polygonal portion 39 and the pinion gear PG1a and the lubricant that is guided into the space between the polygonal portion 39 and the pinion gears PG1b are further guided into the radial oil passages 52, 53, respectively.

Then, the lubricant is guided from the oil passages 52 to the area where the sun gear S1 meshes with the pinion gears PG1b and where the pinion gear PG1a meshes with the pinion gear PG1b, respectively, and from the oil passages 53 to the area where the ring gear R1 meshes with the pinion gear PG1a and where the pinion gear PG1a meshes with the pinion gear PG1b, respectively. As a result, the respective mesh areas are lubricated.

Also, in the example embodiment, lubricant is guided to the area where the sun gear S1 meshes with the pinion gear PG1b, the area where the ring gear R1 meshes with the pinion gear PG1a, and the area where the pinion gear PG1a meshes with the pinion gear PG1b, respectively, via the radial oil passages in the sleeve shaft SL1, the oil passage 51, the axial oil passage 34a, and the radial oil passages 34b, which are provided in series after the axial oil passage in the sleeve shaft SL1. That is, the lubricant takes a single lubricant path when guided from the oil pump to the area where the sun gear S1 meshes with the pinion gear PG1b, the area where the ring gear R1 meshes with the pinion gear PG1a, and the area where the pinion gear PG1a meshes with the pinion gear PG1b, respectively, which enhances the pumping effect. As a result, the lubrication performance improves accordingly, minimizing wear of the pinion gears PG1a, the pinion gears PG1b, the sun gear S1, and the ring gear R1.

Figure 10:
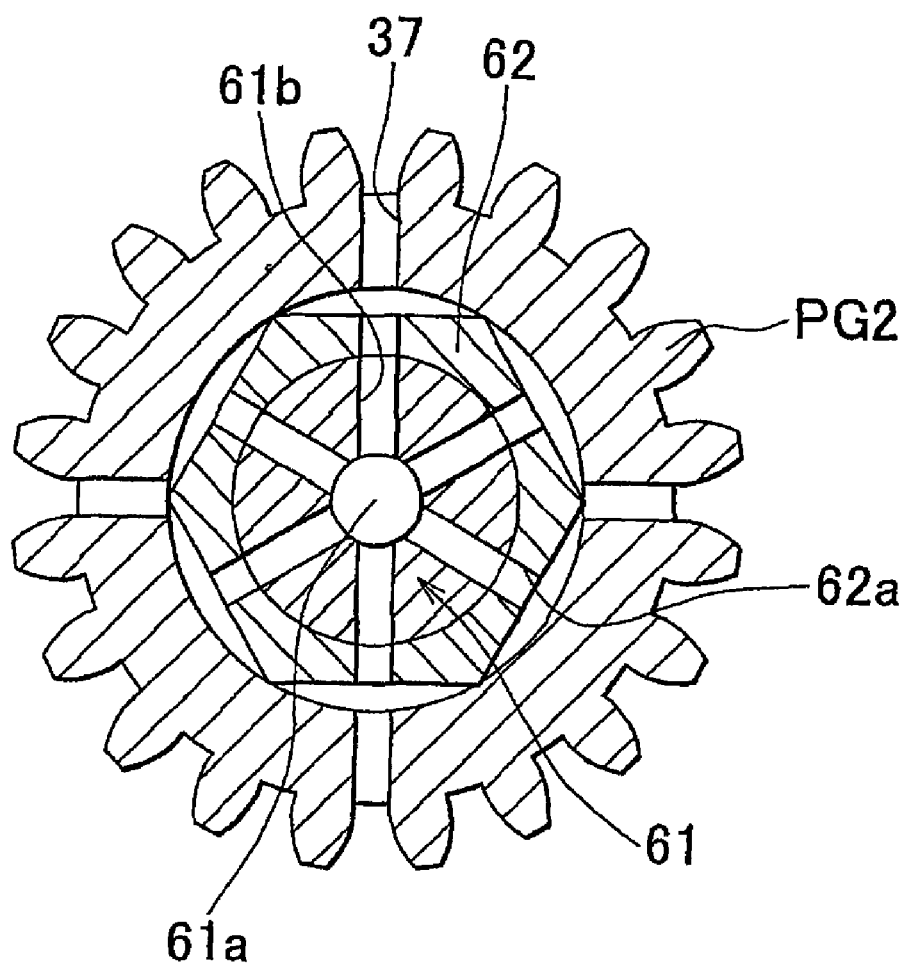
FIG. 10 is a cross-sectional view showing the main portions of the pinion shaft and the pinion gear of the second planetary gearset of the automatic transmission according to the first example embodiment of the invention.

FIG. 10 shows a planetary gearset and an automatic transmission according to the second example embodiment of the invention. The second example embodiment is the same as the first example embodiment described above except for the structure of the pinion shafts. Therefore, in the second example embodiment, the components and elements that are the same as those in the first example embodiment will be denoted by the same numerals and their descriptions will be omitted.

Referring to FIG. 10, each pinion shaft 61 is formed such that the outer periphery is circular over the entire axial length, and an axial oil passage 61a is formed, as the first guide passage, in pinion shaft 61 so as to extend in the axial direction. The axial oil passage 61a communicates with the oil passage 36 (See FIG. 4).

A polygonal member 62, which is a separate member from the pinion shaft 61, is attached on the axial center portion of the pinion shaft 61 so as to cover the pinion shaft 61.

The outer periphery of the polygonal member 62 is hexagonal and radial oil passages 62a are formed as the second guide passage so as to extend in the radial directions. Also, radial oil passages 61b are provided in the pinion shaft 61 as the second guide passage. The respective radial oil passages 61b communicate with the radial oil passages 62a and the axial oil passage 61a.

In the second example embodiment, because the polygonal member 62 is attached on the outer periphery of the pinion shaft 61, as the pinion gear PG2 rotates, the capacity of the space between the outer periphery of the polygonal member 62 and the inner periphery of the pinion gear PG2 changes with respect to each radial oil passage 37.

Thus, the lubricant that has been guided into the space between the outer periphery of the polygonal member 62 and the inner periphery of the pinion gear PG2 can be guided into the radial oil passages 37 by the pumping effect provided by the pinion gear PG2 rotating on the polygonal member 62. As such, the lubricant is supplied to the area where the pinion gear PG2 meshes with the sun gear S2 and to the area where the pinion gear PG2 meshes with the ring gear R2. Accordingly, the same effects as those in the first example embodiment can be obtained.

Further, in the second example embodiment, because the polygonal member 62 is provided separately from the pinion shaft 61, the outer periphery of the pinion shaft 61 does not need to be formed into a polygonal shape, and therefore a conventional pinion shaft may be used as the pinion shaft 61.

Although the outer periphery of the pinion shaft 34 is polygonal or the polygonal member 62 is attached on the outer periphery of the pinion shaft 61 in the respective example embodiments described above, the invention is not limited to such structures. For example, the inner periphery of the pinion gear PG2 may be formed into a polygonal shape.

Figure 11:
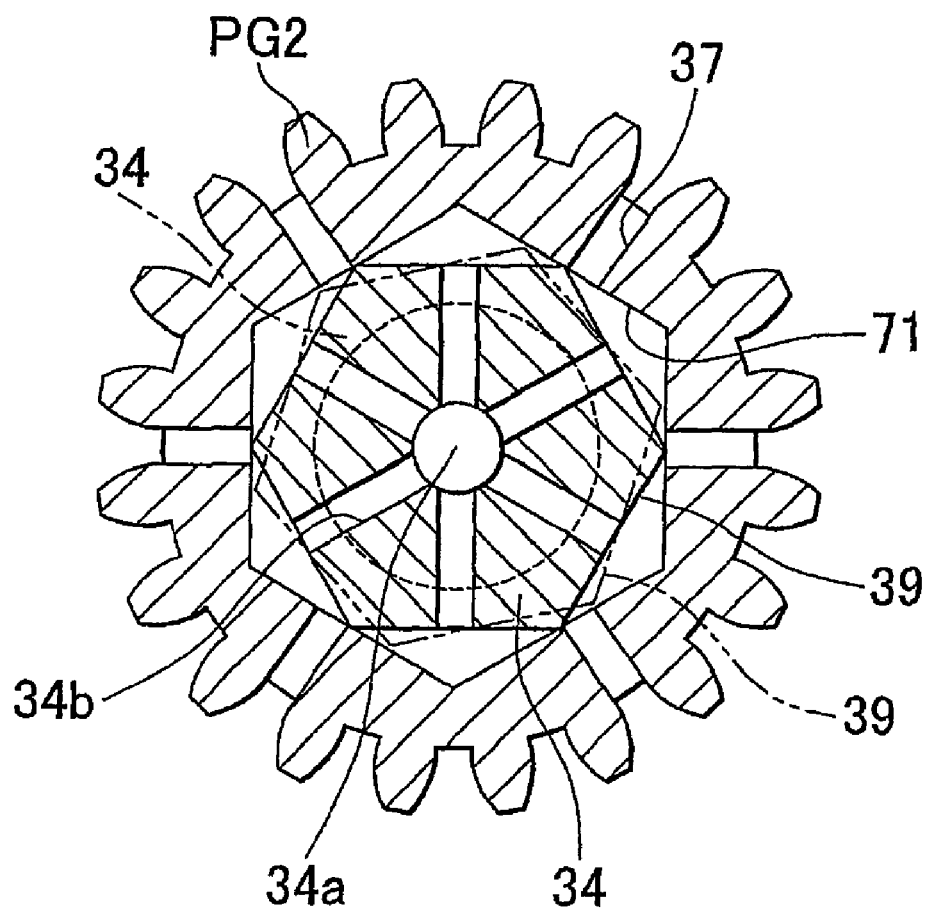
FIG. 11 is a cross-sectional view showing the main portions of the pinion shaft and the pinion gear in the second planetary gearset in other structure of the automatic transmission according to the first example embodiment of the invention.
Figure 12A:
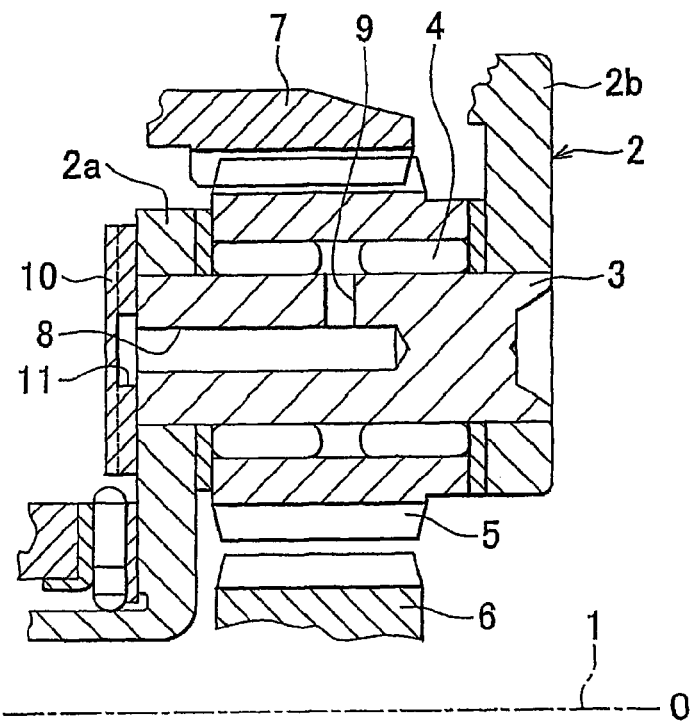
FIG. 12A is a cross-sectional view showing the main portions of a conventional planetary gearset.
Figure 12B:
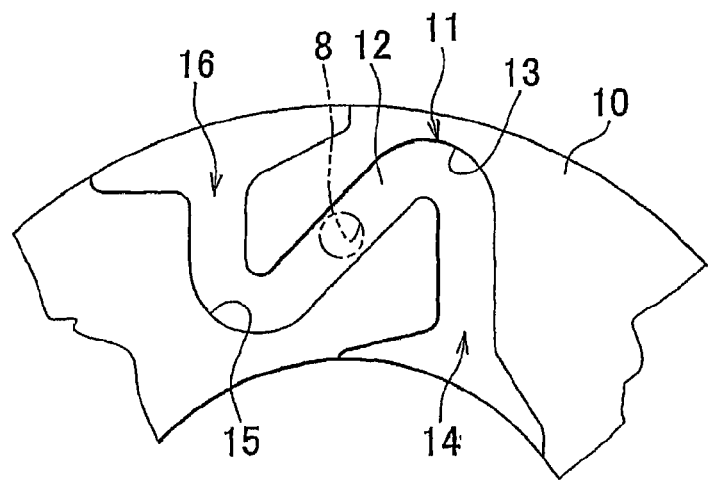
FIG. 12B is a plan view showing the shapes of the grooves formed in a guide plate incorporated in a conventional planetary gearset.

For example, referring to FIG. 11, a polygonal portion 71 may be formed at the inner periphery of the pinion gear PG2, to face the polygonal portion 39 of the pinion shaft 34, so that the space defined between the polygonal portion 39 and the polygonal portion 71 is partitioned into multiple spaces in the circumferential direction of the pinion shaft 34.

According to this structure, as the pinion gear PG2 rotates, the capacity of the space between the outer periphery of the polygonal portion 39 of the pinion shaft 34 and the polygonal portion 71 of the pinion gear PG2 changes more sharply with respect to the radial oil passage 37 as indicated by the solid lines and the two-dotted lines in FIG. 11. This further enhances the pumping effect for the lubricant that is guided via the radial oil passages 34b into each space between the outer periphery of the pinion shaft 34 and the inner periphery of the pinion gear PG2. Therefore, the lubricant is more reliably supplied via the radial oil passages 37 to the area where the pinion gear PG2 meshes with the sun gear S2 and to the area where the pinion gear PG2 meshes with the ring gear R2, respectively.

Meanwhile, in the example embodiments described above, the outer periphery of each pinion shaft is polygonal. However, it may be formed in any shape as long as the capacity of the space between the outer periphery of the pinion shaft 34 and the inner periphery of the pinion gear changes with respect to each radial oil passage 37 as the pinion gear rotates. For example, the outer periphery of each pinion shaft may be formed in a non-uniform shape in which the distance from the axial center of the pinion shaft to the outer periphery of the pinion shaft is not uniform.

As described above, in the planetary gearsets according to the invention, when the carrier is not rotating, but the pinion shaft is rotating, lubricant is reliably guided from the rotational center shaft to the area where the pinion gear and the sun gear mesh and to where the pinion gear and the ring gear mesh, whereby the lubrication performance is improved and wear of the pinion gears, the sun gear, and the ring gear are reduced accordingly. Thus, the periphery of each pinion gear is also appropriately lubricated when a carrier is not rotating in an automatic transmission of a vehicle.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

The invention claimed is:

1. A planetary gearset, comprising:
a sun gear that rotates about a rotational center shaft;
a ring gear that is provided on the radially outer side of the sun gear;
a pinion gear that is provided between the sun gear and the ring gear and meshes with the sun gear and the ring gear, the pinion gear having an inner periphery;
a pinion shaft that extends substantially in parallel with the rotational center shaft and on which the pinion gear is rotatably supported via a bearing, the pinion shaft having an outer periphery and comprising:
a bearing portion on the outer periphery on which the bearing is attached;
a polygonal portion, having a polygonal outer periphery;
a first guide passage that extends in an axial direction of the pinion shaft and into which lubricant is guided from the rotational center shaft; and
a second guide passage, formed in the polygonal portion, that extends in the radial direction of the pinion shaft from the first guide passage, and through which the lubricant is guided from the first guide passage to between the outer periphery of the pinion shaft and the inner periphery of the pinion gear,
wherein a third guide passage is formed in the pinion gear, extending in the radial direction of the pinion gear, and the lubricant guided to between the outer periphery of the pinion shaft and the inner periphery of pinion gear is supplied through the third guide passage to an area where the pinion gear meshes with the sun gear and to an area where the pinion gear meshes with the ring gear, and an inlet of the third guide passage faces the polygonal portion.

2. The planetary gearset according to claim 1, wherein the polygonal portion includes a polygonal member that is provided separately from the pinion shaft and has a polygonal outer periphery and is arranged to cover the pinion shaft, and the second guide passage is formed in the pinion shaft and the polygonal member.

3. The planetary gearset according to claim 1, wherein the inner periphery of the pinion gear that faces the polygonal portion is polygonal.

4. The planetary gearset according to claim 1, wherein the pinion gear and the pinion shaft are a plurality of pinion gears and a plurality of pinion shafts arranged in a double-pinion arrangement between the sun gear and the ring gear.

5. An automatic transmission comprising a plurality of planetary gearsets according to claim 1, wherein the automatic transmission changes, via the plurality of planetary gearsets, the speed of rotation that is input to the rotational center shaft from an internal combustion engine and outputs the rotation.

* * * * *

UNITED STATES PATENT AND TRADEMARK OFFICE
CERTIFICATE OF CORRECTION

| | |
|---|---|
| PATENT NO. | : 7,967,712 B2 |
| APPLICATION NO. | : 12/280406 |
| DATED | : June 28, 2011 |
| INVENTOR(S) | : Yoshikazu Nakamura et al. |

It is certified that error appears in the above-identified patent and that said Letters Patent is hereby corrected as shown below:

| Column | Line | |
|---|---|---|
| 6 | 13 | Change "across-sectional" to --a cross-sectional--. |
| 9 | 16 | Change "line IA" to --line L4--. |

Signed and Sealed this
Seventeenth Day of January, 2012

David J. Kappos
*Director of the United States Patent and Trademark Office*